United States Patent
Chen et al.

(10) Patent No.: US 11,977,221 B2
(45) Date of Patent: May 7, 2024

(54) ABERRATION CORRECTORS BASED ON DISPERSION-ENGINEERED METASURFACES

(71) Applicant: PRESIDENT AND FELLOWS OF HARVARD COLLEGE, Cambridge, MA (US)

(72) Inventors: Wei-Ting Chen, Cambridge, MA (US); Alexander Yutong Zhu, Cambridge, MA (US); Jared F. G. Sisler, Cambridge, MA (US); Federico Capasso, Cambridge, MA (US)

(73) Assignee: PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 840 days.

(21) Appl. No.: 16/971,150

(22) PCT Filed: Feb. 19, 2019

(86) PCT No.: PCT/US2019/018615
§ 371 (c)(1),
(2) Date: Aug. 19, 2020

(87) PCT Pub. No.: WO2019/164849
PCT Pub. Date: Aug. 29, 2019

(65) Prior Publication Data
US 2021/0103141 A1    Apr. 8, 2021

Related U.S. Application Data

(60) Provisional application No. 62/632,913, filed on Feb. 20, 2018.

(51) Int. Cl.
*G02B 27/00* (2006.01)
*G02B 1/00* (2006.01)
(Continued)

(52) U.S. Cl.
CPC ......... *G02B 27/0025* (2013.01); *G02B 1/002* (2013.01); *G02B 1/02* (2013.01);
(Continued)

(58) Field of Classification Search
CPC .............. G02B 27/0025; G02B 27/005; G02B 27/4211; G02B 27/4216; G02B 1/002;
(Continued)

(56) References Cited

U.S. PATENT DOCUMENTS

2012/0328240 A1* 12/2012 Ma ..................... H01Q 15/0086
  385/33
2014/0277433 A1* 9/2014 Pugh ........................ G02C 7/04
  623/6.17
(Continued)

FOREIGN PATENT DOCUMENTS

WO    WO-2017/176921 A1    10/2017

OTHER PUBLICATIONS

Chen, Wei Ting, et al., "Phase and dispersion engineering of metalenses: broadband achromatic focusing and imaging in the visible" Nov. 26, 2017, Cornell University, [retrieved on Apr. 19, 2019] retrieved from the internet: <URL:https://arxiv.org/abs1711.09343v1>.
(Continued)

*Primary Examiner* — Marin Pichler
*Assistant Examiner* — Justin W. Hustoft
(74) *Attorney, Agent, or Firm* — FOLEY & LARDNER LLP

(57) ABSTRACT

An optical device for aberration correction (e.g., chromatic aberration correction) is disclosed. The optical device includes an optical component (e.g., a spherical lens) and a metasurface optically coupled to the optical component. The metasurface includes a plurality of nanostructures that define a phase profile. The phase profile corrects an aberration (e.g.,
(Continued)

chromatic aberration) caused by the optical component. The resulting optical device becomes diffraction-limited (e.g., for the visible spectrum) with the metasurface.

17 Claims, 3 Drawing Sheets

(51) Int. Cl.
*G02B 1/02* (2006.01)
*G02B 3/00* (2006.01)
*G02B 21/33* (2006.01)

(52) U.S. Cl.
CPC ............... *G02B 3/00* (2013.01); *G02B 21/33* (2013.01); *G02B 2003/0093* (2013.01); *G02B 2207/101* (2013.01)

(58) Field of Classification Search
CPC . G02B 1/02; G02B 3/00; G02B 21/33; G02B 2003/0093; G02B 2207/101; G02B 13/006
See application file for complete search history.

(56) References Cited

U.S. PATENT DOCUMENTS

2016/0299426 A1    10/2016    Gates et al.
2017/0212285 A1    7/2017     Arbabi et al.

OTHER PUBLICATIONS

International Search Report and Written Opinion for International Patent Application No. PCT/US2019/018615, mailed May 6, 2019, 10 pages.

* cited by examiner

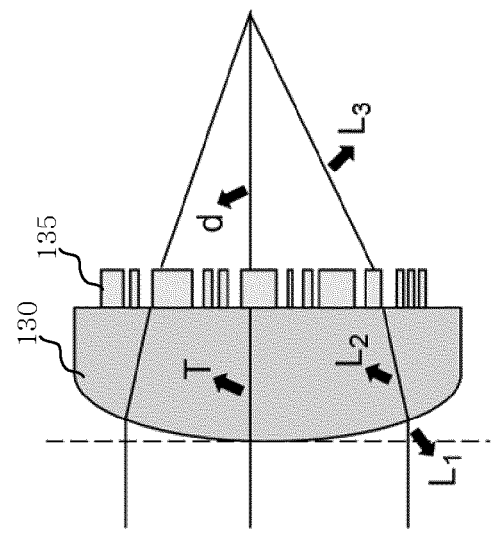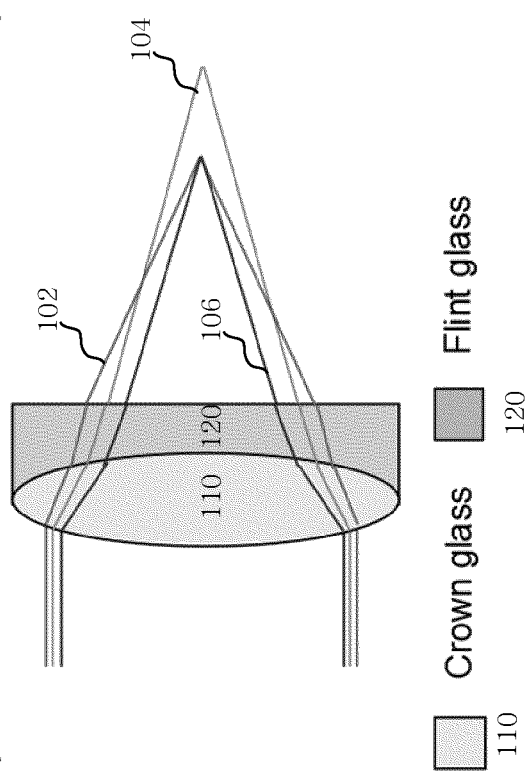
FIG. 1(a)
FIG. 1(b)

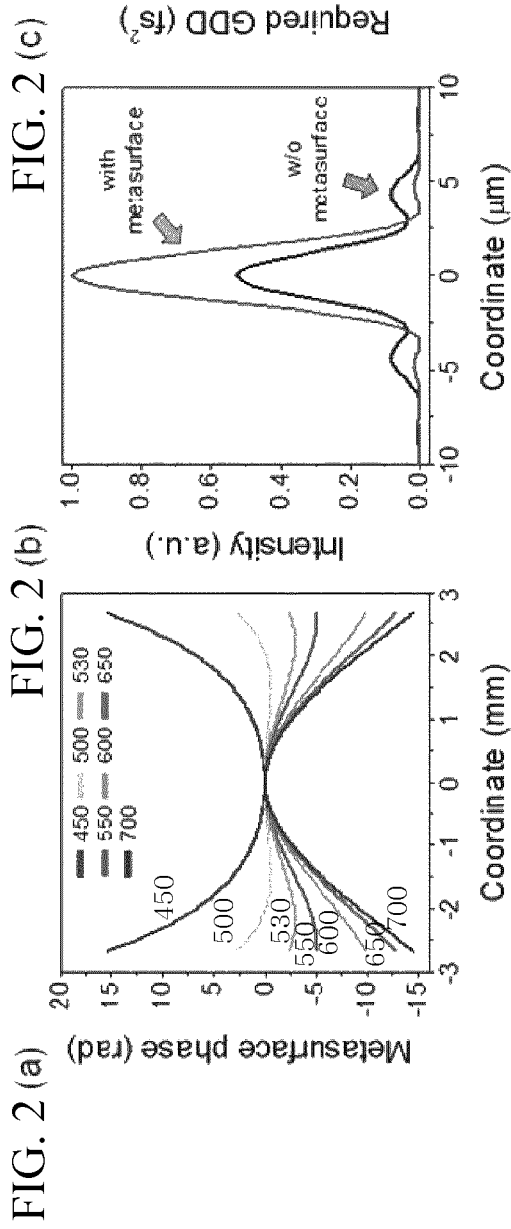
FIG. 2 (a)
FIG. 2 (b)
FIG. 2 (c)
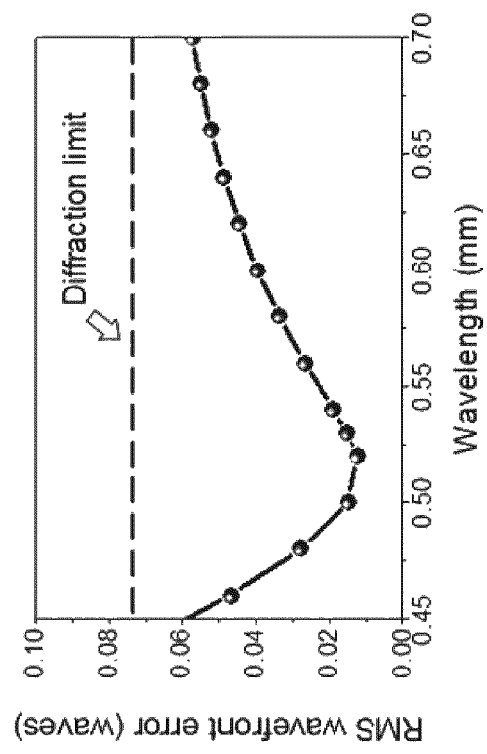
FIG. 2 (e)
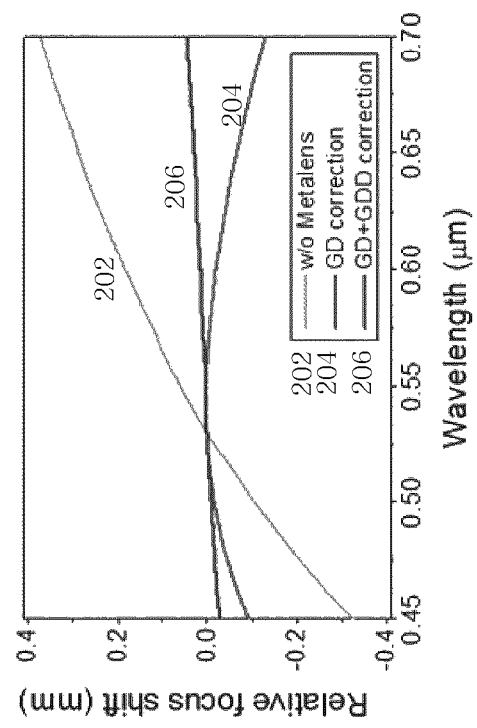
FIG. 2 (d)

ABERRATION CORRECTORS BASED ON DISPERSION-ENGINEERED METASURFACES

CROSS-REFERENCE TO RELATED APPLICATIONS

This application is a National Stage Entry of International Application No. PCT/US2019/018615, filed on Feb. 19, 2019, which claims the benefit of and priority to U.S. Provisional Patent Application No. 62/632,913, filed on Feb. 20, 2018, the contents of which are incorporated herein by reference their entirety.

STATEMENT OF FEDERALLY SPONSORED RESEARCH OR DEVELOPMENT

This invention is made with Government support under FA9550-14-1-0389 and FA9550-16-1-0156, awarded by Air Force Office of Scientific Research. The Government has certain rights in the invention.

BACKGROUND

Comparative refractive optical components such as prisms and lenses are manufactured by glass polishing. Drawbacks of such components include bulky sizes, high manufacturing costs and limited manufacturing precisions, which can prevent the optical components from being used in various applications, including portable systems and conformal or wearable devices. In certain comparative achromatic lens designs, multiple lenses of different glass materials and curvatures are designed by thin-lens approximation and are subsequently cascaded. However, this can result in significant design complexity, a bulky lens system, and the presence of residual chromatic aberrations.

SUMMARY

At least some embodiments of the present disclosure relate to a technology of achromatic lenses that can be implemented for any lens thickness. Some embodiments utilize a thin and frequency-dependent metasurface that manipulates light in either of, or both, spatial and temporal domains. For instance, two metasurfaces can be specified as aberration correctors for a spherical singlet lens and a Zeiss oil immersion objective, respectively. With the introduction of the metasurfaces, the chromatic focal length shifts are reduced significantly, rendering the focal spots diffraction-limited over a large bandwidth. Embodiments disclosed herein can provide for, e.g., camera imaging systems, cellphone imaging systems, telescopes, optical components for optical lithography, or optical components for virtual reality (VR) or augmented reality (AR) devices.

At least some embodiments of the present disclosure provide for an optical device for aberration correction (e.g., chromatic aberration correction). The optical device includes an optical component (e.g., a spherical lens) and a metasurface optically coupled to the optical component. The metasurface includes a plurality of nanostructures that define a phase profile. The phase profile corrects aberrations (e.g., chromatic aberration) caused by the optical component. The resulting optical device may be diffraction-limited for the visible spectrum (e.g., the entire visible spectrum encompassing wavelengths from about 450 nm to about 700 nm).

One aspect of the present disclosure relates to an optical device for aberration correction, including an optical component and a metasurface optically coupled to the optical component. The metasurface includes a plurality of nanostructures that define a phase profile, wherein the phase profile corrects one or more aberrations of the optical component.

In one or more embodiments, the aberrations include one or more monochromatic aberrations and chromatic aberration.

In one or more embodiments, the one or more monochromatic aberrations include spherical aberration, coma, astigmatism, distortion, or field curvature.

In one or more embodiments, the nanostructures include nano-pillars.

In one or more embodiments, a cross-section of the nano-pillars is circular, rectangular, elliptical or square, and the nano-pillars include at least one lossless material in a visible spectrum In one or more embodiments, the at least one lossless material includes $TiO_2$, GaN, $Si_3N_4$, $SiO_2$, $MgF_2$, or LiF.

In one or more embodiments, the optical component is a spherical lens, and the metasurface is attached or separated by an air gap to a planar surface of the spherical lens.

In one or more embodiments, the phase profile of the metasurface is a spatially-dependent and frequency-dependent phase profile.

In one or more embodiments, the phase profile includes a first term for correcting the one or more monochromatic aberrations and one or more derivative terms for correcting chromatic aberration.

In one or more embodiments, the nanostructures of the metasurface are configured to provide spatially-dependent time delay to wavepackets of an incident beam such that the wavepackets delayed by the nanostructures reach a focal point of the optical device simultaneously and have the same temporal profile.

In one or more embodiments, the nanostructures of the metasurface are configured to reduce an arrival time spread of wavepackets of an incident beam at a focal point of the optical device, such that frequency components of the incident beam interfere constructively.

In one or more embodiments, the phase profile corrects chromatic aberration caused by the optical component such that the optical device is diffraction-limited for the visible spectrum.

In one or more embodiments, the optical component is a Zeiss Fluor oil immersion objective, and the metasurface is disposed at an entrance aperture of the Zeiss Fluor oil immersion objective.

Another aspect of the present disclosure relates to an optical device including a lens having a focus, and a metasurface including a plurality of nanostructures. The nanostructures define a phase profile that is a function of a shortest distance between the nanostructures and the focus of the lens, the phase profile configured such that the optical device is diffraction-limited for the visible spectrum.

In one or more embodiments, the phase profile includes a first term for correcting the one or more monochromatic aberrations and one or more derivative terms for correcting chromatic aberration, and the first term is a function of the shortest distance between the nanostructures and the focus of the lens.

In one or more embodiments, the second term is not a function of the shortest distance between the nanostructures and the focus of the lens.

In one or more embodiments, the phase profile is further a function of a thickness of the lens.

Another aspect of the present disclosure relates to an optical device including an optical component and a metasurface optically coupled to the optical component. The metasurface includes a plurality of nanostructures that define a phase profile. The nanostructures of the metasurface are configured to reduce an arrival time spread of wavepackets of an incident beam at a focal point of the optical device, such that frequency components of the incident beam interfere constructively.

In one or more embodiments, the nanostructures of the metasurface are configured to provide spatially-dependent time delay to wavepackets of the incident beam such that the wavepackets delayed by the nanostructures reach the focal point of the optical device simultaneously.

In one or more embodiments, the phase profile corrects chromatic aberration caused by the optical component such that the optical device is diffraction-limited for the visible spectrum.

BRIEF DESCRIPTION OF THE DRAWINGS

Aspects of this disclosure will be readily understood by reference to the following detailed description taken in conjunction with the accompanying drawings.

FIG. 1a schematically illustrates a doublet lens including two different glass materials for chromatic aberration correction, according to some comparative implementations.

FIG. 1b schematically illustrates an optical device including a metasurface attached to a spherical lens for aberration correction, according to one or more embodiments of the present disclosure.

FIG. 2a illustrates phase profiles of sample metasurfaces as functions of spatial coordinate for various wavelengths, according to one or more embodiments of the present disclosure.

FIG. 2b illustrates focal spot intensities of a spherical lens attached with a metasurface, according to one or more embodiments of the present disclosure, and a spherical lens without the metasurface attached.

FIG. 2c illustrates specified group delay (GD) and group delay dispersion (GDD) from the center to the edge of the metasurface, according to one or more embodiments of the present disclosure.

FIG. 2d illustrates a comparison between relative focal length shifts for a spherical lens without a metasurface attached, a spherical lens with a metasurface attached for GD correction according to one or more embodiments of the present disclosure, and a spherical lens with a metasurface attached for GD and GDD correction according to one or more embodiments of the present disclosure.

FIG. 2e illustrates root-mean-square (RMS) wavefront errors for the metasurface with both group delay and group delay dispersion engineering, according to one or more embodiments of the present disclosure.

DETAILED DESCRIPTION

Figure 3A:
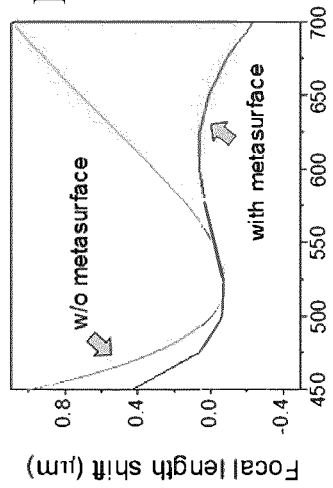
FIG. 3a illustrates a ray-tracing diagram for a Zeiss oil immersion Fluor objective coupled with a metasurface at a wavelength, according to one or more embodiments of the present disclosure.

At least some embodiments of the present disclosure implement metasurfaces that can correct aberrations of any imaging system and can significantly improve spatial resolution of the imaging system (e.g., up to diffraction limit). The metasurfaces include nanoscale features (also referred to as nanostructures) such as nano-pillars which are designed with various group delays and group delay dispersions. The nano-pillars can be manufactured using, e.g., lithography. The nano-pillars are arranged to manipulate light wavefronts in either of, or both, spatial and temporal domains. The metasurfaces can be specified for any lens thickness in any electromagnetic wave region. This universal arrangement together with the ease of manufacturing and precise alignment allow the disclosed technology to be used in various applications, such as in microscopy, lithography, high-end compact imaging system, VR and AR.

The nano-pillars (or other nanoscale features) of the metasurfaces can be fabricated by, e.g., lithography. The fabrication process can have a nanometer precision, and is readily scalable. Compared to comparative methods of grinding and polishing in comparative lens manufacturing, the process of manufacturing the metasurface has a low cost and is scalable. The disclosed technology can be applied in any electromagnetic wave region. In some embodiments, the nano-pillars can be anisotropic for simultaneously manipulating polarization. The nano-pillars can be made of, or can include, e.g., oxides, nitrides, fluorides, metals, silicon, or other suitable materials.

Chromatic Aberrations

Lens aberrations can be classified into two types: monochromatic and chromatic aberrations. The chromatic aberration relates to a focal length shift, and is challenging to correct over a large bandwidth due to factors including limited choice of glasses, manufacturing difficulties, and design complexity. Certain comparative approaches of correcting chromatic aberration are based on cascading two or more lenses of different curvatures, lens materials and thicknesses.

FIG. 1a schematically illustrates a comparative doublet lens including two different glass materials for chromatic aberration correction. The glass materials can be, e.g., crown glass 110 and flint glass 120. The lines 102, 104, and 106 of FIG. 1a respectively represent light of different wavelengths.

The doublet lenses are designed based on a pair of simultaneous equations:

$$\phi_1 + \phi_2 = \phi_{total}, \tag{1}$$

$$\frac{\phi_1}{V_1} + \frac{\phi_2}{V_2} = 0, \quad (2)$$

where $$V = \frac{n_D - 1}{n_F - n_c}$$

is the Abbe number (n is the refractive index and the subscripts D, F and C represent different wavelengths (e.g., 589.3, 486.1 and 656.3 nm, respectively)) and $\phi=1/f$ is the lens power (f is the focal length of lens). Equation 1 is specifically valid for thin lenses. Equation 2 ensures that the focal lengths of the doublet are equal at wavelength $\lambda=486.1$ and 656.3 nm, see FIG. 1(a). However, the focal lengths for intermediate values (line 104) between the two wavelengths can deviate from the designed focal length (as shown in FIG. 1a), resulting in residual chromatic aberrations.

Aberration Correction Using Metasurface

FIG. 1b schematically illustrates an optical device including a metasurface attached to a spherical lens for aberration correction (including, e.g., chromatic aberration correction), according to various embodiments of the present disclosure. The spherical lens may be, e.g., lens model LA1700, manufactured using BK7 glass by THORLABS Inc. The metasurface can be attached to a planar surface of the spherical lens. Alternatively, the metasurface and the spherical lens can be separated by an air gap. The optical device of FIG. 1b is also referred to as an aberration corrector or metasurface doublet lens. The depicted metasurface 130 includes nano-pillars (shown as rectangles 135 in FIG. 1b) $L_1$ to $L_3$ denote propagation lengths of light, while T and d represent lens thickness and the distance from the nano-pillars to the focus or focal point (e.g., a distance between a top of the nano-pillars to the focus, or a shortest distance between the nano-pillars and the focus). The nano-pillars in FIG. 1b are drawn schematically and may not be drawn to scale. In some embodiments, the nano-pillars have a height of, e.g., about 0.3 micrometer (μm), about 0.6 μm, about 1 μm, or about 2 μm. In some embodiments, the nano-pillars have a height in a range of up to about 2 μm, up to about 1 μm, or up to about 0.6 μm, and down to about 0.3 μm or less. The metasurface doublet lens may have an entrance aperture of, e.g., about 3 mm, about 6 mm, about 10 mm, or about 20 mm, and a numerical aperture of, e.g., about 0.05, about 0.1, about 0.2, or about 0.5.

By specifying the geometry and dimensions (and/or other features) of the nano-pillars 135 show in FIG. 1b, the metasurface 130 can impart arbitrary wavefront modulation and dispersion to an incident beam. The metasurface 130 has a spatially-dependent and frequency-dependent phase profile $\varphi(r,\omega)$ to respectively correct either of, or both, the spherical aberration and chromatic aberration of the spherical lens. The target phase profile $\varphi(r,\omega)$ can be described as:

$$L_1\frac{\omega}{c} + L_2\frac{\omega}{c}n_{glass} + \varphi(r, \omega) + L_3\frac{\omega}{c} = T\frac{\omega}{c}n_{glass} + \varphi(0, \omega) + d\frac{\omega}{c}, \quad (3)$$

where $n_{glass}$ is the refractive index of the material (e.g., the BK7 glass) of the spherical lens, L is the propagation length (which is a function of lens coordinate r) depicted in FIG. 1b, and T and d are the thickness of the spherical lens and the distance from the top of nano-pillars to the focus, respectively. The phase at lens center may be assumed to be zero because relative phase is to be fulfilled. This leads to the target phase profile $$\varphi(r, \omega) = \varphi\frac{\omega}{c}n_{glass}(T - L_2) + \frac{\omega}{c}(d + L_1 - L_3). \quad (4)$$

Equation 4 can be expanded as a Taylor series at a design angular frequency $\omega_d$:

$$\varphi(r, \omega) = \varphi(r, \omega_d) + \frac{\partial \varphi}{\partial \omega}\bigg|_{\omega=\omega_d}(\omega - \omega_d) + \frac{\partial^2 \varphi}{\partial \omega^2}\bigg|_{\omega=\omega_d}(\omega - \omega_d)^2 + \dots . \quad (5)$$

The first-ordered and second-ordered derivatives of the target phase profile (referred to as group delay and group delay dispersion hereinafter) are $$\frac{\partial \varphi}{\partial \omega} = \frac{T - L_2}{c}n_g + \frac{d - L_2 - L_2}{c}, \quad (6)$$

$$\frac{\partial^2 \varphi}{\partial \omega^2} = \frac{T - L_2}{c}\frac{\partial n_g}{\partial \omega}, \quad (7)$$

where $$n_g = n + \omega\frac{\partial n}{\partial \omega}$$

is the group index of the glass material (e.g., the BK 7 glass) of the spherical lens.

Terms of Eq. 5 can correspond to functionalities of the metasurface. The first term $\varphi(r, \omega_d)$ and the derivative terms correct for the monochromatic and chromatic aberration of the spherical lens (at least under normal incidence), respectively. The correction of chromatic aberration may be understood by treating an incident beam as wavepackets formed by broadband frequencies. The role of the metasurface is to provide spatially-dependent time delay shown in Eq. 6 such that these outgoing wavepackets from different nano-pillars can reach the focus simultaneously. The group delay dispersion and the higher order terms ensure these outgoing wavepackets are identical, or similar, in terms of the wavepackets' temporal profiles. The net effect is to minimize the time spread at the focus such that frequency components of the light interfere constructively at the focal point. The more derivative terms the metasurface can fulfill by the phase profile, the smaller a focal length shift can be achieved.

Result of Metasurface Aberration Corrector

FIG. 2a illustrates phase profiles of sample metasurfaces as functions of spatial coordinate for wavelengths from about 450 nm to about 700 nm. In some embodiment, the metasurface of FIG. 1b is designed at $\lambda$=about 530 nm. At the design wavelength of about 530 nm, FIG. 2a shows a W-shaped phase profile, similar to a phase profile of a Schmidt plate for correcting spherical aberration. The phase profile thus renders the combination of the metasurface and the spherical lens diffraction-limited.

FIG. 2b illustrates focal spot intensities of a spherical lens attached with a metasurface and a spherical lens without the metasurface attached. In some embodiments, each nano-pillar on the metasurface may correspond to a group delay and a group delay dispersion, which are specified based on Equation 6 and Equation 7.

FIG. 2c illustrates specified group delay and group delay dispersion from the center to the edge of the metasurface. The specified group delay (GD) and group delay dispersion (GDD) lead to a non-linear change of focal length shift (also referred to as relative focus shift), when the wavelength deviates from the design wavelength of about 530 nm.

FIG. 2d illustrates a comparison between relative focal length shifts for a spherical lens without metasurface attached (202), a spherical lens with a metasurface attached for GD correction (204), and a spherical lens with a metasurface attached for GD and GDD correction (206). The design wavelength is about 530 nm. As shown in FIG. 2d, if the phase profile of the metasurface merely incorporate the GD correction, the resulting focal length shift is relatively close to focal length shift of a comparative doublet lens. If the phase profile of the metasurface incorporate the GD correction and the GDD correction, the resulting focal length shift can be at least as small as focal length shifts of triplet lenses. In general, the more derivative terms of Equation 5 the metasurface can incorporate in specifying the phase profile, the smaller a focal length shift can be achieved.

FIG. 2e illustrates root-mean-square (RMS) wavefront errors for the metasurface with both group delay and group delay dispersion engineering. As shown in FIG. 2e, the RMS wavefront errors are below the diffraction limit at wavelengths from about 450 nm to about 700 nm. Thus, the doublet of the metasurface and the spherical lens is diffraction-limited over substantially the entire visible bandwidth. The resulting metasurface lens is superior to and distinct from comparative doublet or triplet lenses. The comparative lenses use multiple compound lenses including spherical surfaces, which result in significant spherical aberration.

Aberration Correction for Zeiss Fluor Oil Immersion Objective

The embodiments described herein can be implemented for various purposes, such as Zeiss Fluor oil immersion objective.

FIG. 3a illustrates a ray-tracing diagram for a Zeiss oil immersion Fluor objective coupled with a metasurface at a wavelength of about 560 nm. The NA of the Zeiss oil immersion Fluor objective can be, e.g., about 1.49. The metasurface can be placed at the entrance aperture of the objective. In some embodiments, the diameter of the entrance aperture is about 2 mm, about 5 mm, or about 10 mm.

Figure 3B:
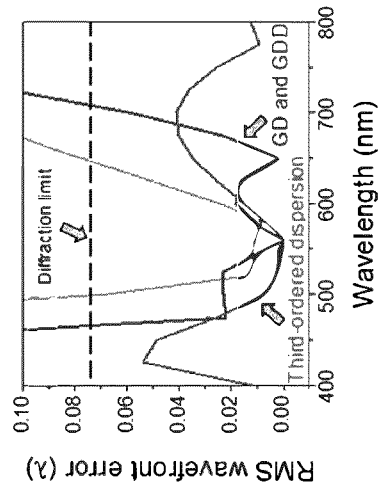
FIG. 3b illustrates a comparison of a focal length shift of a Zeiss oil immersion Fluor objective coupled with a metasurface according to one or more embodiments of the present disclosure, and a focal length shift of a Zeiss oil immersion Fluor objective without a metasurface.

FIG. 3b illustrates a comparison of a focal length shift of a Zeiss oil immersion Fluor objective coupled with a metasurface and a focal length shift of a Zeiss oil immersion Fluor objective without a metasurface. As shown in FIG. 3b, the metasurface significantly reduces the focal length shift caused by the Zeiss oil immersion Fluor objective.

Figure 3D:
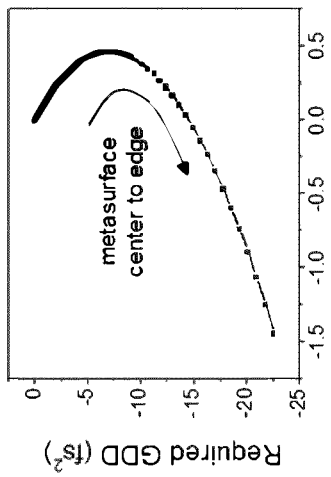
FIG. 3d illustrates group delay and group delay dispersion from the center to the edge of a metasurface, according to one or more embodiments of the present disclosure.
Figure 3C:
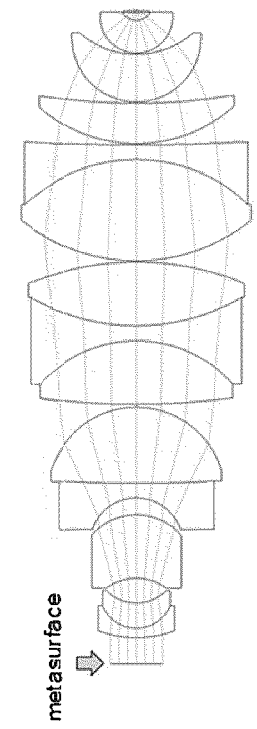
FIG. 3c illustrates focal spot profiles at three wavelengths in the visible spectrum for a Zeiss oil immersion Fluor objective coupled with a metasurface (first row) according to one or more embodiments of the present disclosure, and a Zeiss oil immersion Fluor objective without a metasurface (second row).

FIG. 3c illustrates focal spot profiles at three wavelengths in the visible spectrum for a Zeiss oil immersion Fluor objective coupled with a metasurface (first row) and a Zeiss oil immersion Fluor objective without a metasurface (second row). As shown in FIG. 3c, the reduced focal length shift leads to diffraction-limited focal spots for wavelengths from about 475 nm to about 675 nm.

FIG. 3d illustrates group delay and group delay dispersion from the center to the edge of the metasurface. Accordingly, in some embodiments, the nano-pillars of the metasurface are specified to cover a range of group delay of about 1.5 fs and group delay dispersion of about 23 $fs^2$, respectively. The specified group delay for the Zeiss oil immersion Fluor objective is smaller than the specified group delay for the spherical lens, because the objective intrinsically has a weaker focal length shift.

Figure 3E:
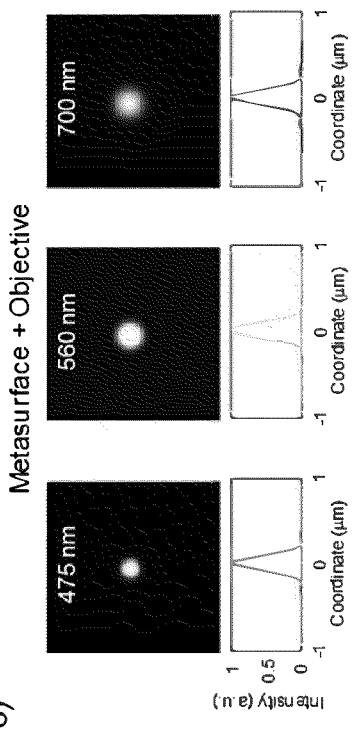
FIG. 3e illustrates RMS wavefront errors for an objective without a metasurface coupled, an objective with a metasurface coupled for GD correction according to one or more embodiments of the present disclosure, and an objective with a metasurface coupled for GD and GDD correction according to one or more embodiments of the present disclosure.

FIG. 3e illustrates RMS wavefront errors for an objective without a coupled metasurface, an objective with a metasurface coupled for GD correction, and an objective with a metasurface coupled for GD and GDD correction. As shown in FIG. 3e, in some embodiments, the chromatic aberration of the objective from violet to the near-infrared red can be substantially eliminated if the phase profile of the metasurface can incorporate up to third-order derivative terms of Equation 5.

It is to be understood that the term "design" or "designed" (e.g., as used in "design wavelength," "design focal length" or other similar phrases disclosed herein) refers to parameters set during a design phase; which parameters after fabrication may have an associated tolerance.

As used herein, the singular terms "a," "an," and "the" may include plural referents unless the context clearly dictates otherwise.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated by such arrangement.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale.

There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An optical device, comprising:
   a lens having a focus; and
   a metasurface comprising a plurality of nanostructures that define a phase profile that is a function of a shortest distance between the nanostructures and the focus of the lens, the phase profile configured such that the optical device is diffraction-limited for the visible spectrum,
   wherein the phase profile includes a first term for correcting one or more monochromatic aberrations and a second term for correcting chromatic aberration, and the first term is a function of the shortest distance between the nanostructures and the focus of the lens.

2. The optical device of claim 1, wherein the second term is not a function of the shortest distance between the nanostructures and the focus of the lens.

3. The optical device of claim 1, wherein the phase profile is further a function of a thickness of the lens.

4. The optical device of claim 1, wherein the one or more monochromatic aberrations include spherical aberration, coma, astigmatism, distortion, or field curvature.

5. The optical device of claim 1, wherein the nanostructures include nano-pillars.

6. The optical device of claim 5, wherein a cross-section of the nano-pillars is circular, rectangular, elliptical or square, and the nano-pillars include at least one lossless material in a visible spectrum.

7. The optical device of claim 6, wherein the at least one lossless material includes $TiO_2$, GaN, $Si_3N_4$, $SiO_2$, $MgF_2$, or LiF.

8. The optical device of claim 1, wherein the metasurface is attached or separated by an air gap to a planar surface of the lens.

9. The optical device of claim 1, wherein the lens is a spherical lens.

10. The optical device of claim 1, wherein the phase profile of the metasurface is a spatially-dependent and frequency-dependent phase profile.

11. The optical device of claim 1, wherein the second term for correcting chromatic aberration is one or more derivative terms for correcting chromatic aberration.

12. The optical device of claim 1, wherein the nanostructures of the metasurface are configured to provide spatially-dependent time delay to wavepackets of the incident beam such that the wavepackets delayed by the nanostructures reach a focal point of the optical device simultaneously.

13. The optical device of claim 12, wherein the nanostructures of the metasurface are further configured to provide spatially-dependent time delay to wavepackets of an incident beam such that the wavepackets delayed by the nanostructures have the same temporal profile.

14. The optical device of claim 1, wherein the nanostructures of the metasurface are configured to reduce an arrival time spread of wavepackets of an incident beam at a focal point of the optical device, such that frequency components of the incident beam interfere constructively.

15. The optical device of claim 1, wherein the chromatic aberration is caused by the lens such that the optical device is diffraction-limited for the visible spectrum.

16. The optical device of claim 1, further comprising a Zeiss Fluor oil immersion objective, wherein the metasurface is disposed at an entrance aperture of the Zeiss Fluor oil immersion objective.

17. The optical device of claim 16, wherein the nanostructures of the metasurface are further configured to reduce a focal length shift caused by the Zeiss Fluor oil immersion objective.

* * * * *